(12) United States Patent
Swecker

(10) Patent No.: US 10,293,855 B2
(45) Date of Patent: May 21, 2019

(54) ZERO-TURN MOWER WITH SELECTIVE STEERING CONTROL

(71) Applicant: Harry Swecker, Stauton, VA (US)

(72) Inventor: Harry Swecker, Stauton, VA (US)

(*) Notice: Subject to any disclaimer, the term of this patent is extended or adjusted under 35 U.S.C. 154(b) by 117 days.

(21) Appl. No.: 15/648,617

(22) Filed: Jul. 13, 2017

(65) Prior Publication Data
US 2018/0015951 A1 Jan. 18, 2018

Related U.S. Application Data

(60) Provisional application No. 62/361,589, filed on Jul. 13, 2016.

(51) Int. Cl.
| B62D 11/04 | (2006.01) |
| B62D 11/00 | (2006.01) |
| B62D 1/02 | (2006.01) |
| F15B 15/06 | (2006.01) |
| F16H 19/06 | (2006.01) |
| B62D 7/08 | (2006.01) |
| F16H 35/18 | (2006.01) |

(52) U.S. Cl.
CPC .............. *B62D 11/005* (2013.01); *B62D 1/02* (2013.01); *B62D 7/08* (2013.01); *B62D 11/04* (2013.01); *F15B 15/06* (2013.01); *F16H 19/06* (2013.01); *F16H 35/18* (2013.01); *B60Y 2200/223* (2013.01); *F16H 2019/0681* (2013.01); *F16H 2019/0695* (2013.01)

(58) Field of Classification Search
CPC .......... B62D 11/005; B62D 1/02; B62D 7/08; B62D 11/04; F15B 15/06; F16H 19/06; F16H 35/18; F16H 2019/0681; F16H 2019/0695; B60Y 2200/223
See application file for complete search history.

(56) References Cited

U.S. PATENT DOCUMENTS

| 3,429,392 | A | * | 2/1969 | Ryskamp | ............... | B62D 11/08 180/6.3 |
| 5,042,238 | A | * | 8/1991 | White, III | ................ | B62D 9/00 180/6.24 |
| 5,288,091 | A | * | 2/1994 | Deschamps | .............. | B62D 7/15 180/409 |
| 6,240,713 | B1 | | 6/2001 | Thomas | | |
| 7,237,629 | B1 | | 7/2007 | Bland et al. | | |

(Continued)

Primary Examiner — Tony H Winner
Assistant Examiner — Marlon A Arce
(74) Attorney, Agent, or Firm — Global Intellectual Property Agency, LLC; Daniel Boudwin

(57) ABSTRACT

A zero-turn mower with selective steering control. The zero-turn mower includes a pair of front wheels having sprockets operably connected thereto, a drive gear rotatably disposed within a housing affixed to the mower frame, and a drive chain that couples the sprockets to the drive gear. A plate gear is slidably disposed on the frame. A pair of actuator arms bias the plate gear rearward to a first position. A pair of pedals can be depressed simultaneously to move the plate gear forward to a second position. When the plate gear is in the first position the drive gear is disengaged, and the front wheels may turn freely to any direction. When the plate gear is in the second position the drive gear engages, and the pedals allow the user to control the direction of the front wheels, allowing the mower to be safely utilized on sloped terrain.

6 Claims, 2 Drawing Sheets

(56) References Cited

U.S. PATENT DOCUMENTS

| | | |
|---|---|---|
| 7,686,107 B1 | 3/2010 | Bland et al. |
| 8,152,183 B1 | 4/2012 | Bell et al. |
| 8,522,901 B1 | 9/2013 | VanLue |
| 9,254,865 B2 * | 2/2016 | Schaedler ................ B62D 7/08 |
| 2002/0092685 A1 * | 7/2002 | Hauser ................ B62D 11/183 |
| | | 180/6.3 |
| 2003/0019682 A1 * | 1/2003 | Schaedler .............. A01D 34/69 |
| | | 180/308 |
| 2006/0175098 A1 | 8/2006 | Sutherland |

* cited by examiner

ZERO-TURN MOWER WITH SELECTIVE STEERING CONTROL

CROSS REFERENCE TO RELATED APPLICATIONS

This application claims the benefit of U.S. Provisional Application No. 62/361,589 filed on Jul. 13, 2016. The above identified patent application is herein incorporated by reference in its entirety to provide continuity of disclosure.

FIELD OF THE INVENTION

The present invention relates to zero-turn mowers. More specifically, the present invention provides a zero-turn mower having a steering control that can be selectively engaged to control the direction of the front wheels, which enables the zero-turn mower to be safely utilized on sloped terrain.

BACKGROUND OF THE INVENTION

Zero-turn mowers are often utilized when mowing grass due to the extremely small turn radius enabled by the free and independent rotation of the front wheels. However, difficulties arise when a typical zero-turn mower is operated on a hillside. Using a zero-turn mower to mow horizontally on a hillside can be difficult and dangerous. The front wheels on a zero-turn mower rotate freely and cannot be directionally controlled. When a zero-turn mower is on a slope, the weight of the zero-turn mower causes the front wheels to turn toward the direction of the downward slope. If the zero-turn mower orients itself toward the bottom of the slope, a user may lose control until the zero-turn mower reaches the bottom of the slope. In extreme cases, the zero-turn mower may tip over and land on or roll over a user, potentially causing serious injury. Currently, it is difficult to maintain control of a zero-turn mower while riding on sloped terrain. Accordingly, a safe and efficient mechanism that allows users to selectively control the direction of the front wheels of a zero-turn riding lawn mower desired.

Devices exist in the known art that improve mower safety. These devices, however, have many drawbacks. There exists mowers that allow the user to control the direction of the front wheels, but these mowers do not also provide a means for allowing the front wheels to move freely when desired. This eliminates the main advantage of the zero-turn mower, which is to have a nearly zero-turning radius. Likewise, existing mowers with front wheels that turn freely to any direction do not include a means for selectively controlling the front wheels, which can cause difficulties when using the mower on a hillside or otherwise sloped terrain.

In light of the devices disclosed in the known art, it is submitted that the present invention substantially diverges in design elements from the known art and consequently it is clear that there is a need in the art for an improvement to existing zero-turn mowers. In this regard the instant invention substantially fulfills these needs.

SUMMARY OF THE INVENTION

In view of the foregoing disadvantages inherent in the known types of zero-turn mowers now present in the prior art, the present invention provides a zero-turn mower with selective steering control wherein the same can be utilized for providing convenience for the user when selectively controlling the direction of the front wheels of the mower.

The zero-turn mower with selective steering control includes a frame and a pair of front wheels comprising a left front wheel and a right front wheel disposed on a front end of the frame. The left front wheel and the right front wheel are each configured to turn about a vertical axis of rotation, and the left front wheel and the right front wheel each include a chain sprocket operably connected thereto. A drive gear is disposed on the frame between the pair of wheels, and a drive chain operably connects the left front wheel chain sprocket, the right front wheel chain sprocket, and the drive gear.

A plate gear is rotatably coupled to a plate gear bracket, and the plate gear bracket is slidably disposed within a sliding bracket affixed to the frame. The zero-turn mower further includes a pair of actuator arms each having a first end affixed to the plate gear and a second end pivotally connected to the frame, and each of the actuator arms include a spring pin that is configured to bias the plate gear toward a rear end of the frame in a first position. A pair of pedals includes a left pedal and a right pedal, and each pedal is operably connected one of the actuator arms.

The plate gear is configured to slide to a second position when the left pedal and the right pedal are depressed simultaneously, such that the plate gear engages the drive gear when the plate gear is in the second position. Depression of the left pedal is configured cause the pair of front wheels to turn in a first direction when the plate gear is in the second position, and depression of the right pedal is configured to cause the pair of front wheels to turn in a second direction when the plate gear is in the second position.

An object of the present invention is to provide a zero-turn mower with a selective steering control that can be engaged to allow the direction of the front wheels to be controlled or disengaged to allow the front wheels to rotate freely and independently.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
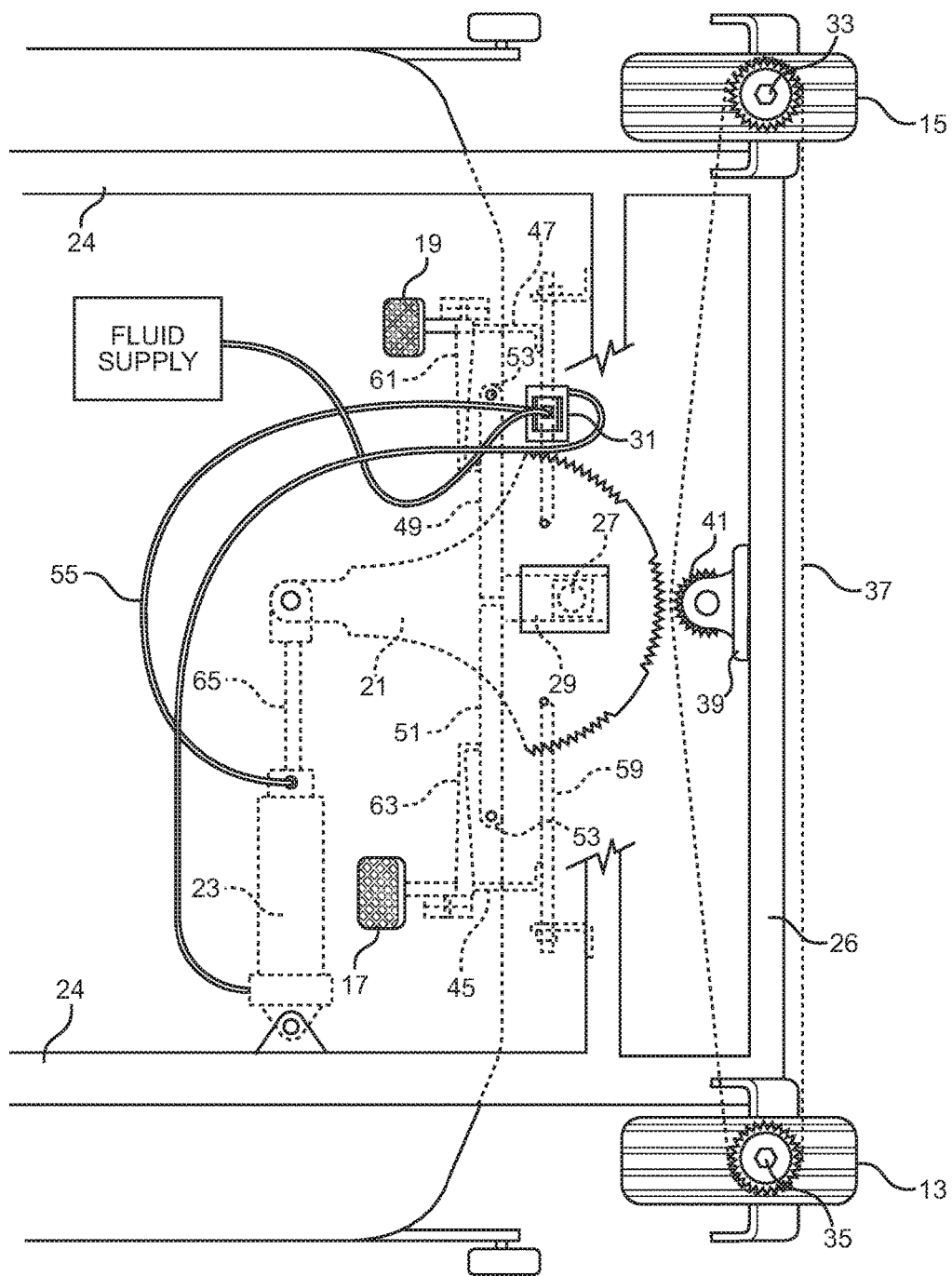
FIG. 1 shows a top down view of the zero-turn mower with selective steering control.

Reference is made herein to the attached drawings. Like reference numerals are used throughout the drawings to depict like or similar elements of the zero-turn mower with selective steering control. For the purposes of presenting a brief and clear description of the present invention, the preferred embodiment will be discussed as used for selectively controlling the direction of the front wheels of a zero-turn mower. The figures are intended for representative purposes only and should not be considered to be limiting in any respect.

Figure 2:
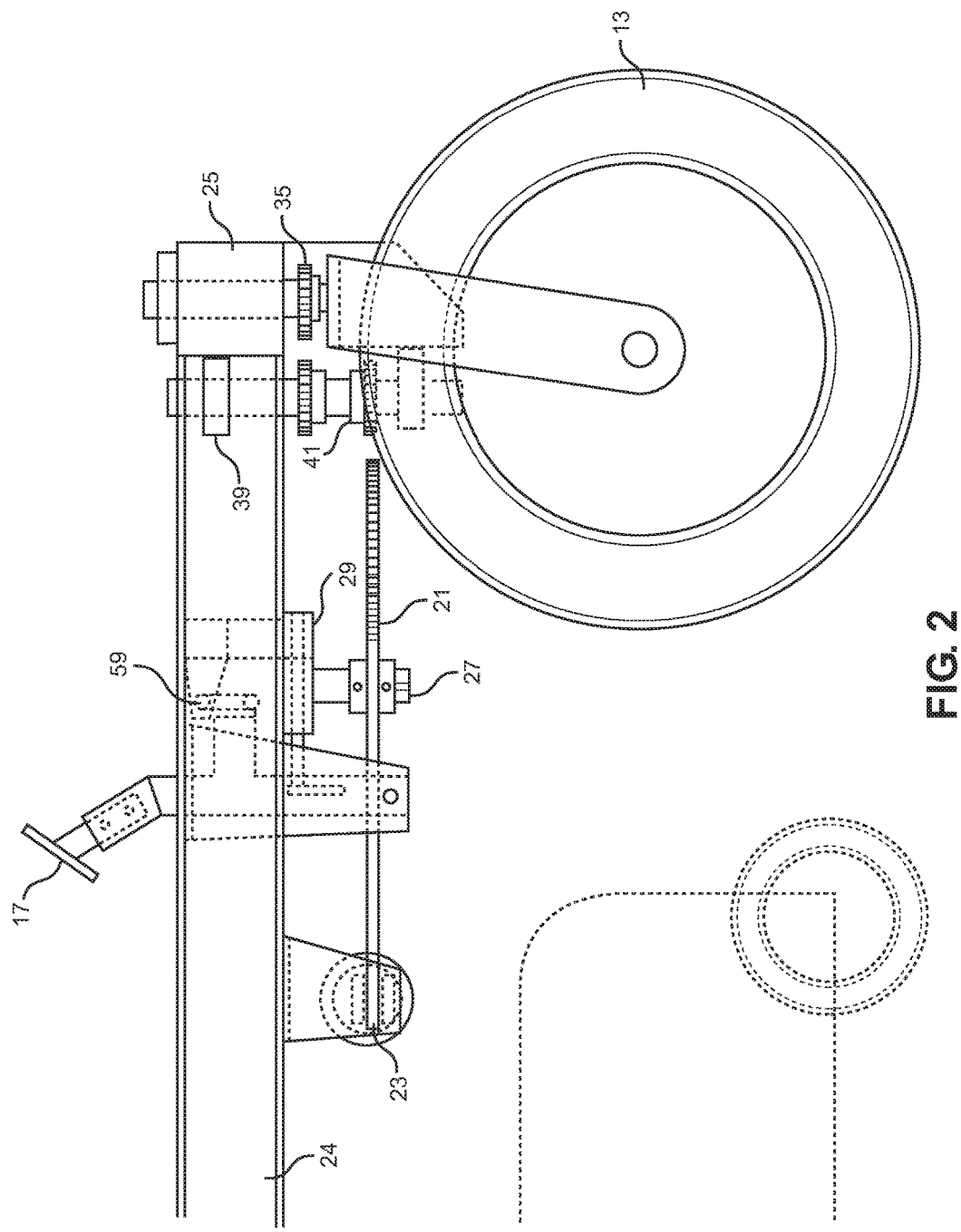
FIG. 2 shows a side view of the zero-turn mower with selective steering control.

Referring now to FIGS. 1 and 2, there is shown a top down view of zero-turn mower with selective steering and a side view of the zero-turn mower with selective steering, respectively. The zero-turn mower 11 comprises a frame 25 that supports and houses the various components thereof. A pair of front wheels including a left front wheel 13 and a right front wheel 15 are disposed on a front end 26 of the frame 10. The front wheels 13, 15 can turn freely and independently from one another, as they do with a typical zero-turn mower. Alternatively, the user can engage the steering system in order to control the direction of the front wheels 13, 15.

Each of the front wheels 13, 15 include a sprocket 33, 35 operably connected thereto. The sprockets 33, 35 may be positioned below the frame 25. The sprockets 33, 35 are coupled to the wheels 13, 15 such that the sprockets 33, 35 turn in the same direction when the wheels 13, 15 turn. The zero-turn mower 11 further includes a drive gear 41 disposed between the left front wheel 13 and the right front wheel 15. In the shown embodiment, the drive gear 41 is equidistant from each wheel 13, 15. The drive gear 41 is rotatably connected to a pillow block bearing 39. The pillow block bearing 39 includes a housing that is affixed to the front end 26 of the mower frame 25. A drive chain 37 operably connects the drive gear 41 to the left front sprocket 33 and the right front sprocket 35, such that movement of the drive chain 37 causes the left and right sprockets 33, 35 to turn in one direction, and movement of the drive chain 37 in the opposite direction correspondingly causes rotation of the left and right sprockets 33, 35 in the opposite direction.

A plate gear 21 is rotatably coupled to a plate gear bracket 27, which is affixed to the frame 25. The plate gear 21 can slide forward and rearward within the plate gear bracket 27. A pair of actuator arms 49, 51 are affixed to the plate gear 21 at a first end thereof, such that each actuator arm 49, 51 connects to an opposing side of the plate gear 21. The opposing ends of the actuator arms 49, 51 are pivotally coupled to the frame 25 via a spring pin 53. The spring pin 53 is configured to bias the actuator arms 49, 51 toward the rear end 24 of the frame 25. This causes the plate gear 21 to maintain a default first position toward the rear 24 of the frame 25. When in the default first position, the plate gear 21 is separated from the drive gear 41, which allows the front wheels 13, 15 to rotate about their vertical axes, i.e., turn, freely and independently from one another. In one embodiment, there is a half inch gap between the plate gear 21 and the drive gear 41 when the plate gear 21 is in the first position.

The zero-turn mower 11 further comprises a pair of pedals consisting of a left pedal 19 and a right pedal 17. The right pedal 17 is operably connected to the right actuator arm 51, and the left pedal 19 is operably connected to the left actuator arm 49. When the right and left pedals 17, 19 are depressed simultaneously, the plate gear 21 slides forward along the plate gear bracket 29 until it reaches a second position such that the plate gear 21 engages the drive gear 41. In the shown embodiment, this is accomplished via a pivot bar 59 to which both of the pedals 19, 17 are operably coupled that allows the left and right pedals 19, 17 to pivot forward to an engaged position. However, other embodiments may utilize a different mechanism for engaging the pedals 19, 17.

In the illustrated embodiment, a hydraulic cylinder 23 is affixed to the frame 23. A piston 65 extends outwardly from the cylinder 23 and connects to a rear end of the plate gear 21. The cylinder 23 is in fluid communication with a fluid supply and a switch 31 disposed on the pivot bar 59 via connecting fluid lines 55. The switch 31 is configured to direct movement of the piston 65, which can be extended out of the cylinder 23 to an extended position or retracted into the cylinder 23 to a retracted position. When the plate gear 21 is in the second position such that the drive gear 41 is engaged, the switch 31 enables depression of the left pedal 19 to cause the piston 65 to extend out of the cylinder 23. This in turn causes the plate gear 21 to rotate clockwise about its pivot point 27. Clockwise rotation of the plate gear 21 causes counterclockwise rotation of the drive gear 41, which in turn causes counterclockwise rotation of the sprockets 35, 33 via the drive chain 26, causing both of the front wheels 15, 13 to turn left. Similarly, the switch 31 enables depression of the right pedal 17 to cause the piston 65 to be retracted into the cylinder 23. This in turn causes the plate gear 21 to rotate counterclockwise about its pivot point 27. Counterclockwise rotation of the plate gear 21 causes clockwise rotation of the drive gear 41, which in turn causes clockwise rotation of the sprockets 33, 35 via the drive chain 26, causing both of the front wheels 15, 13 to turn right.

In use, the operator of the zero-turn mower 11 may use it as a typical zero-turn mower with freely and independently movable front wheels 13, 15, since the plate gear 21 is separated from the drive gear 41 by default. When the operator wishes to control the direction of the front wheels 13, 15, the operator depresses each pedal 19, 17 such that the pivot bar 59 pivots forward and the plate gear 21 slides forward along the plate gear bracket 27, causing the plate gear 21 to engage the drive gear 41. The operator may then depress the left pedal 19 to cause the wheels 13, 15 to turn left, or depress the right pedal 17 to cause wheels 13, 15 to turn right. The operator may alternate applying pressure to the left and right pedals 19, 17 when operating the zero-turn mower 11 on a sloped surface, which allows the operator to maintain the zero-turn mower 11 perpendicular to the sloped surface. In this way, the present zero-turn mower 11 provides a selective steering control that can be engaged to control the direction of the front wheels 13, 15, allowing the zero turn mower 11 to be effectively and safely utilized on a hillside or otherwise sloped terrain.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A zero-turn mower, comprising:
   a frame;
   a pair of front wheels comprising a left front wheel and a right front wheel disposed on a front end of the frame, the left front wheel and the right front wheel each configured to turn about a vertical axis of rotation, the left front wheel and the right front wheel each comprising a chain sprocket operably connected thereto;

a drive gear disposed on the frame between the pair of wheels;

a drive chain operably connecting the left front wheel chain sprocket, the right front wheel chain sprocket, and the drive gear;

a plate gear rotatably coupled to a plate gear bracket, the plate gear bracket slidably disposed within a sliding bracket, the sliding bracket affixed to the frame;

a pair of actuator arms each having a first end affixed to the plate gear and a second end pivotally affixed to the frame, each of the actuator arms comprising a spring pin configured to bias the plate gear toward a rear end of the frame in a first position;

a pair of pedals comprising a left pedal and a right pedal, each pedal operably connected to one of the actuator arms;

wherein the plate gear is configured to slide to a second position when the left pedal and the right pedal are depressed simultaneously, such that the plate gear engages the drive gear when the plate gear is in the second position;

wherein depression of the left pedal is configured to cause the pair of front wheels to turn in a first direction when the plate gear is in the second position;

wherein depression of the right pedal is configured to cause the pair of front wheels to turn in a second direction when the plate gear is in the second position.

2. The zero-turn mower of claim 1, wherein the drive gear is rotatably coupled to a pillow block bearing, wherein the pillow block bearing is disposed within a housing that is affixed to the frame.

3. The zero-turn mower of claim 1, wherein the drive gear is equidistant from the left front wheel and the right front wheel.

4. The zero-turn mower of claim 1, wherein the left front wheel and the right front wheel are configured to rotate independently and freely when the plate gear is in the first position.

5. The zero-turn mower of claim 1, further comprising a hydraulic cylinder affixed to the frame, the hydraulic cylinder comprising a piston operably connected to the plate gear, wherein the piston is configured to be movable between an extended position and a retracted position.

6. The zero-turn mower of claim 5, wherein the left pedal is configured to move the piston toward the extended position when the left pedal is depressed and the plate gear is in the second position, and wherein the right pedal is configured to move the piston toward the retracted position when the right pedal is depressed and the plate gear is in the second position.

* * * * *